(12) United States Patent
Wang

(10) Patent No.: US 8,887,169 B2
(45) Date of Patent: Nov. 11, 2014

(54) TASK ASSIGNMENT IN CLOUD COMPUTING ENVIRONMENT

(75) Inventor: Zhanjie Wang, Dalian (CN)

(73) Assignee: Empire Technology Development LLC, Wilmington, DE (US)

( * ) Notice: Subject to any disclaimer, the term of this patent is extended or adjusted under 35 U.S.C. 154(b) by 36 days.

(21) Appl. No.: 13/202,226

(22) PCT Filed: Sep. 15, 2010

(86) PCT No.: PCT/CN2010/076936
§ 371 (c)(1),
(2), (4) Date: Aug. 18, 2011

(87) PCT Pub. No.: WO2012/034273
PCT Pub. Date: Mar. 22, 2012

(65) Prior Publication Data
US 2012/0278812 A1    Nov. 1, 2012

(51) Int. Cl.
*G06F 9/46* (2006.01)
*G06F 9/50* (2006.01)
*H04L 29/08* (2006.01)

(52) U.S. Cl.
CPC .................. *G06F 9/505* (2013.01); *H04L 67/10* (2013.01)
USPC .......................................... 718/104; 709/226

(58) Field of Classification Search
None
See application file for complete search history.

(56) References Cited

U.S. PATENT DOCUMENTS

| | | | |
|---|---|---|---|
| 2006/0129881 A1* | 6/2006 | Furuichi et al. | 714/11 |
| 2009/0300210 A1 | 12/2009 | Ferris | |
| 2010/0030866 A1 | 2/2010 | Bedi | |
| 2011/0016214 A1* | 1/2011 | Jackson | 709/226 |
| 2011/0088038 A1* | 4/2011 | Kruglick | 718/104 |
| 2011/0145621 A1* | 6/2011 | Albano et al. | 713/340 |
| 2011/0246627 A1* | 10/2011 | Kern | 709/220 |
| 2011/0302194 A1* | 12/2011 | Gonzalez et al. | 707/769 |
| 2012/0005685 A1* | 1/2012 | Chen et al. | 718/104 |
| 2012/0011190 A1* | 1/2012 | Driesen et al. | 709/202 |

FOREIGN PATENT DOCUMENTS

| | | |
|---|---|---|
| CN | 101557551 | 10/2009 |
| CN | 101662483 | 3/2010 |
| CN | 101719842 | 6/2010 |
| CN | 101753608 | 6/2010 |
| KR | 1020100092850 A1 | 8/2010 |

OTHER PUBLICATIONS

PCT International Search Report PCT/ISA/210 for PCT/CN2010/076936 dated Jun. 23, 2011.

(Continued)

*Primary Examiner* — Emerson Puente
*Assistant Examiner* — Mehran Kamran
(74) *Attorney, Agent, or Firm* — Moritt Hock & Hamroff LLP; Steven S. Rubin, Esq.

(57) ABSTRACT

Technologies are generally described for a system and method for assigning a task in a cloud. In some examples, the method may include receiving a task request relating to a task and determining service related data relating to the task based on the task request. In some examples, the method may include receiving resource data relating to a first and second resource in the cloud. In some examples, the method may include determining a first correlation value between the task and the first resource and a second correlation value between the task and the second resource based on the service related data and the resource data. In some examples, the method may include assigning the task to the first resource based on the first and second correlation value.

17 Claims, 4 Drawing Sheets

(56) References Cited

OTHER PUBLICATIONS

PCT Written Opinion of the International Searching Authority PCT/ISA/237 for PCT/CN2010/076936 dated Jun. 23, 2011.
"Cloud computing" retrieved from Wikipedia.org. on Jul. 29, 2010, 1-11.
http://opencloudmanifesto.org; (Spring 2009), 1-7.
Boss, et al. "Cloud Computing"; IBM Corporation (2007), 1-17.
Google App Engine (GAE). http://code.google.com/appengine/2009; (Jan. 23, 2009), 1-7.
https://aws.amazon.com/ec2/; downloaded Nov. 9, 2011, 1-11.
IBM, Microsoft, others align on open clouds. http://news.cnet.com/8301-19413 3-10208165-240.html; (Mar. 31, 2009), 1-3.
"Trends and Research Challenges in Cloud Computing," on Mar. 27, 2009 Accessed at http://web.archive.org/web/20120501045630/http://iablog.sybase.com/paulley/2009/03/trends-and-research-challenges-in-cloud-computing, Accessed on Jun. 25, 2014, 3 pages.
Yang, Y. et al., "An Algorithm in SwinDeW-C for Scheduling Transaction-Intensive Cost-Constrained Cloud Workflows," IEEE Fourth International Conference on eScience, 2008, pp. 374-375.

* cited by examiner

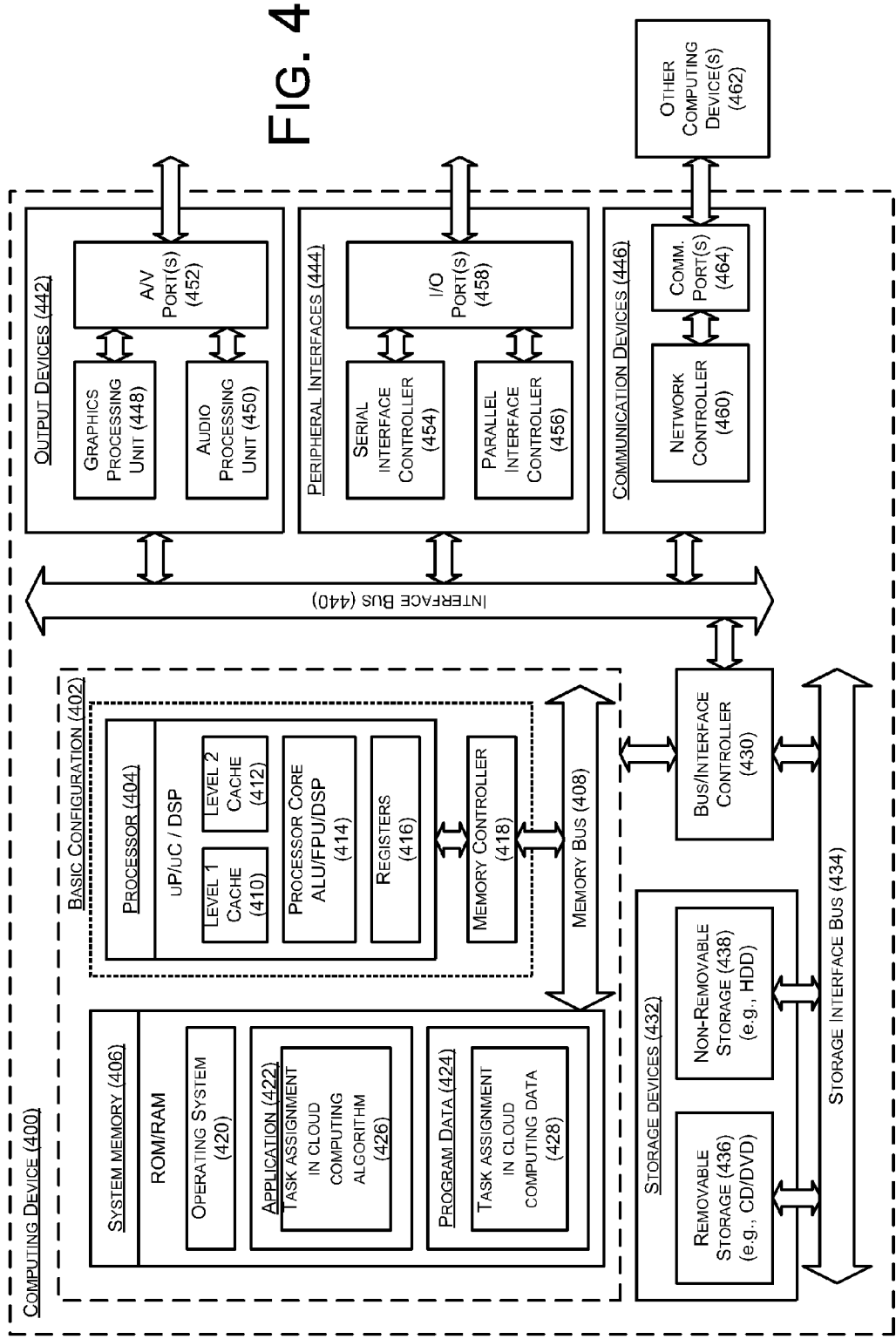

TASK ASSIGNMENT IN CLOUD COMPUTING ENVIRONMENT

CROSS REFERENCE TO RELATED APPLICATIONS

This application is a 371 of International Application No. PCT/CN2010/076936, filed Sep. 15, 2010. The entirety of this application is incorporated by reference.

BACKGROUND

Unless otherwise indicated herein, the materials described in this section are not prior art to the claims in this application and are not admitted to be prior art by inclusion in this section.

A network may include two or more computers in communication with each other through a communication link. In a cloud computing environment, resources in the form of processors, storage, and software may be shared among processors in communication with the cloud. A task request may be received by the cloud and one of the resources may be assigned to handle the task.

SUMMARY

In an example, a method for assigning a task in a cloud is described. In an example, the cloud includes at least a first resource and a second resource. In one example the method includes receiving, at a first processor, a task request relating to a task. In one example the method includes determining, at the first processor, service related data relating to the task based on the task request. In one example the method includes receiving, at a second processor, resource data relating to the first and second resource. In one example the method includes receiving, at a third processor, the service related data and the resource data. In one example the method includes determining, at the third processor, a first correlation value between the task and the first resource. In one example the first correlation value is based on the service related data and the resource data. In one example the method includes determining, at the third processor, a second correlation value between the task and the second resource. In one example the second correlation value is based on the service related data and the resource data. In one example the method includes assigning, by the third processor, the task to the first resource based on the first correlation value and the second correlation value.

In an example, a cloud effective to assign a task is described. In an example, the cloud includes a first resource, a second resource, a first processor, a second processor in communication with the first resource and the second resource, and a third processor in communication with the first processor and the second processor. In an example, the first processor is effective to receive a task request relating to a task and determine service related data relating to the task based on the task request. In an example, the second processor is effective to receive resource data relating to the first and second resource. In an example, the third processor is effective to determine a first correlation value between the task and the first resource. In an example, the first correlation value is based on the service related data and the resource data. In an example, the third processor is effective to determine a second correlation value between the task and the second resource. In an example, the second correlation value is based on the service related data and the resource data. In an example, the third processor is effective to assign the task to the first resource based on the first and the second correlation value.

In an example, a system effective to assign a task is described. In an example, the system includes a first cloud including a first access point, a first resource and a second resource. In an example, the system includes a second cloud including a second access point, a third resource and a fourth resource. In an example, the first cloud is effective to receive a task request relating to a task. In an example, the first cloud is effective to determine service related data relating to the task based on the task request. In an example, the first cloud is effective to receive first resource data relating to the first and second resource. In an example, the first cloud is effective to determine a first correlation value between the task and the first resource. In an example, the first correlation value is based on the service related data and the first resource data. In an example, the first cloud is effective to determine a second correlation value between the task and the second resource. In an example, the second correlation value is based on the service related data and the first resource data. In an example, the first cloud is effective to send the task request to the second cloud based on the first and second correlation value. In an example, the second cloud is effective to receive the task request. In an example, the second cloud is effective to determine the service related data relating to the task based on the task request. In an example, the second cloud is effective to receive second resource data relating to the third and fourth resource. In an example, the second cloud is effective to determine a third correlation value between the task and the third resource. In an example, the third correlation value is based on the service related data and the second resource data. In an example, the second cloud is effective to determine a fourth correlation value between the task and the fourth resource. In an example the fourth correlation value is based on the service related data and the second resource data. In an example, the second cloud is effective to assign the task to the third resource based on the first and the second correlation value to produce a task assignment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 is a block diagram illustrating an example computing device that is arranged to perform task assignment in a cloud computing environment in accordance with the present disclosure;

Figure 1:
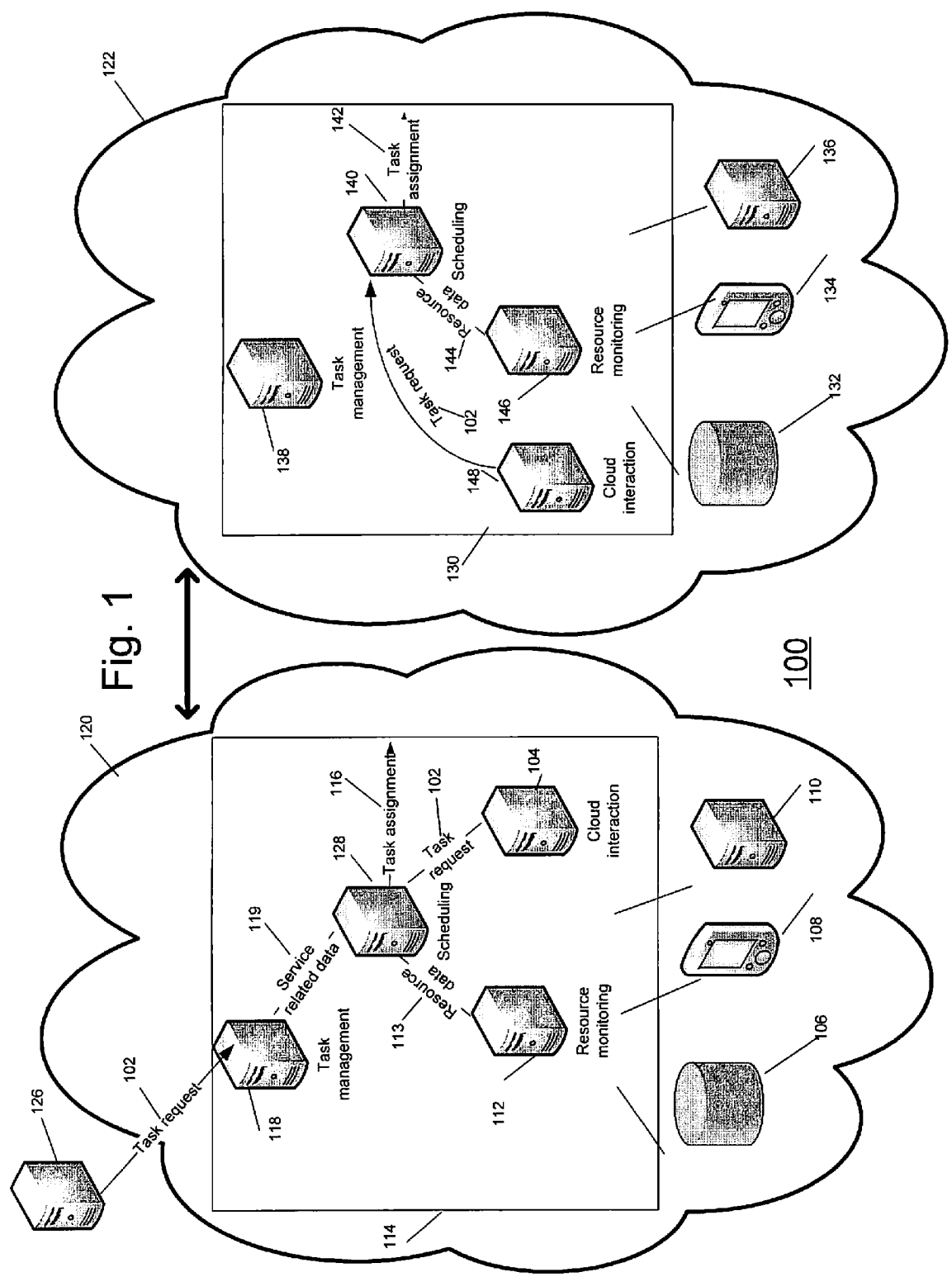
FIG. 1 illustrates some example systems that can be utilized to implement task assignment in a cloud computing environment.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to task assignment in a cloud computing environment.

Briefly stated, technologies are generally described for a system and method for assigning a task in a cloud. In some examples, the method may include receiving a task request relating to a task and determining service related data relating to the task based on the task request. In some examples, the method may include receiving resource data relating to a first and second resource in the cloud. In some examples, the method may include determining a first correlation value between the task and the first resource and a second correlation value between the task and the second resource based on the service related data and the resource data. In some examples, the method may include assigning the task to the first resource based on the first and second correlation value.

FIG. 1 illustrates some example systems that can be utilized to implement task assignment in a cloud computing environment. In some examples, as explained in more detail below, system 100 may include first cloud 120 and/or at least a second cloud 122 in communication with each other. In an example, each cloud 120, 122 may include one or more access points, such as task management module 118, through which processors outside the cloud can communicate with resources in the cloud. For example, the access point may be configured to require a fee or subscription in order to allow communication with resources in the cloud.

In some examples, first cloud 120 may include two or more resources 106, 108, 110 and/or a scheduling system 114. Resources 106, 108, 110 may include, for example, processors, memories, routers, etc. In some examples, scheduling system 114 may be configured to receive a task request 102 from a requesting processor 126 and assign a resource to handle a task relating to task request 102 based on a scheduling algorithm as shown by task assignment 116. In some examples, scheduling system 114 may assign a resource in a transparent manner so that requesting processor 126 need not know which resource is being assigned to handle task request 102. As discussed in more detail below, in examples where scheduling system 114 determines that no resource in cloud 120 is related closely enough to the task, scheduling system 114 may be configured to send task request 102 to second cloud 122. In these examples, scheduling system 130 may be configured to assign a resource 132, 134, 136 in second cloud 122 to handle request 102.

In some examples, scheduling system 114 may include one or more software agents or modules that may be distributed among resources in cloud 120. In an example, scheduling system 114 may include at least one task management module 118, a resource monitoring module 112, a scheduling module 128, and/or a cloud interaction module 104, all in communication. In some examples, scheduling system 130 may include one or more software agents or modules that may be distributed among resources in cloud 122. In an example, scheduling system 130 may include at least one task management module 138, a resource monitoring module 146, a scheduling module 140, and/or a cloud interaction module 148, all in communication. In some examples, these modules may be implemented in one housing or distributed among two or more housings.

Discussion below will focus on cloud 120 though it should be clear that similar elements in cloud 122 or other clouds may have similar functions and operations. In an example, resource monitoring module 112 may be configured to receive resource data 113 relating to resources available in cloud 120. For example, resource data 113 may include a capacity of resources 106, 108, 110, a number of processors, a size and type of memory, network traffic, usable disk space, etc.

In an example, task management module 118 may be configured to manage task request 102. For example, task management module 118 may be configured to extract and analyze task request 102 for service related data 119. In an example, service related data 119 may include a number of service requests, desired resources, desired response time, start time, communication volume, etc.

In an example, as discussed in more detail below, cloud interaction module 104 may be configured to receive task request 102 and send task request 102 to second cloud 122. In example, cloud interaction module 104 may be configured to send request 102 to second cloud 122 and receive task assignments 142 from second cloud 122. Based on the task assignments 142, cloud interaction module 104 may be configured to send information to scheduling module 128 indicating a particular resource in a particular cloud that may be selected to handle task request 102.

In an example, scheduling module 128 may be configured to assign a particular resource to handle a task relating to task request 102 based on a determined correlation value between the task and the particular resource. In an example, the correlation value may indicate how much of a similarity exists between the task and the particular resource. For example, if a task should be assigned a particular type of resource, a higher correlation value may be determined between a resource of that type and the task. In an example, a correlation value between a task and a particular resource may be determined based on a correlation value between the task and tasks previously handled by the particular resource. For example, the task-resource correlation value between a task and a particular resource may increase with an increase of a sum of task-task correlation values between the task to be assigned and tasks previously assigned to the particular resource. In an example, the task-resource correlation value between a task and a particular resource may decrease with an increase of a sum of task-task correlation values between the task to be assigned and tasks assigned to any of the resources in the cloud or clouds.

In some examples, the following formula may be used by scheduling module 128:

$$C_{ip} = \frac{\sum_{k \in T_p} r_{ik}}{\sum_{j \in T} r_{ij}}, \sum_{j \in T} r_{ij} \neq 0$$

$C_{ip}$ may be the correlation value between a task i and a resource p. A current task set may be T, a task set on a particular resource P may be $T_p$, $r_{ik}$ may be the correlation value between task i and task k, $r_{ij}$ may be the correlation value between task i and task j.

In some examples, scheduling module 128 may be configured to determine a correlation value between a task relating to task request 102 and two or more of resources 106, 108, 110 in one or more clouds 120, 122. In an example, scheduling module 128 may be configured to assign a task relating to task request 102 to the particular resource with a correlation value to the task that is a highest value, compared with other correlation values. In an example, scheduling module 128 may be configured to assign a task relating to task request 102 to the particular resource with a correlation value to the task that is above a threshold.

In an example, scheduling module 128 may assign a task relating to task request 102 based on evaluation rules that may be stored in, for example, one of resources 106, 108, 110. Evaluation rules may suggest an assignment of a resource based on factors relating to a performance of cloud 120 such as a communication load in cloud 120, load balancing among resources, scheduling overhead inside the cloud and to another cloud, response time from resources, service quality, reliability, fault-tolerance, and safety. In an example, data values used for the factors in the evaluation rules may be received by task management module 118 and resource monitoring module 112. In some examples, each data value for the relevant factors may be assigned a weight based on task request 102 and/or a state of cloud 120. In an example, if a task relating to task request 102 should receive a fast response, then the data value relating to the response time factor may receive a higher weight in the evaluation rule. In an example, if a task relating to task request 102 should receive a high communication volume, then the value relating to the communication volume factor may receive a higher weight in the evaluation rule. A load status of cloud 120 may be used to affect a weight of the value of the load balancing factor.

In an example, task management module 118 may be configured to receive task request 102. Task management module 118 may be configured to extract service related data 119 from task request 102 and send service related data 119 to scheduling module 128. In the example, scheduling module 128 may be configured to request resource data 113 from resource monitoring module 112. In an example, scheduling module 128 may be configured to determine a correlation value between a task relating to task request 102 and at least some devices in cloud 120 and/or cloud 122. Based on the determined correlation value, task management module 118 may be configured to assign task request 126 to be handled by a particular resource 106, 108, 110 with a highest relative correlation value. In an example where none of the resources in cloud 120 have a determined correlation value to task request 102 above a threshold, task scheduling module 128 may be configured to send task request 102 to cloud interaction module 104. In an example, scheduling module 128 may be configured to send task request 102 to cloud interaction module 104 when service related data 119 indicates that task request 102 should be handled by a particular resource not available in cloud 120.

In the example, cloud interaction module 104 may be configured to send task request 102 to cloud interaction module 148 in second cloud 122. Cloud interaction module 148 in scheduling system 130 of second cloud 122 may be configured to receive task request 102 and send task request 102 to scheduling module 140. In the example, scheduling module 140 may be configured to determine the service related data in the task relating to the task request. In the example, scheduling module 140 may be configured to receive resource data relating to resources 132, 134, 136. In the example, scheduling module 140 may be configured to determine a correlation value between task request 102 and resources 132, 134, 136 based on the service related data and the resource data. In examples where scheduling module 140 determines at least one correlation value between a particular resource and task request 102 above a threshold, scheduling module 140 may be configured to generate task assignment 142. In these examples, cloud interaction module 148 may be configured to notify cloud interaction module 104 of task assignment 142.

In some examples, scheduling module 128 may be configured to receive the notification regarding task assignment 142 from second cloud 122 and other clouds. Scheduling module 128 may be configured to determine task assignment 116 based on task assignment 142 and an intra-cloud scheduling cost between cloud 120 and 122. For example, the intra-cloud scheduling cost may take into account delays associated in sending a request from one cloud to another cloud.

Among other possible benefits, as software agents or modules may be used, communication and transparent transfer of data among two or more clouds can be realized and support of cross-cloud management may be achieved. As the resource with a high correlation value may be chosen, a communication load either inter-cloud or intra-cloud may be effectively reduced. As information to compute the correlation values may be collected by distributed modules, communication cost complexity may be reduced.

Distributed scheduling modules may be used so that each part of a cloud may have the independent capability to assign a task. Decisions may also be distributed and performed by multiple clouds. Performance may not be affected in cases when multiple clouds merge into a bigger cloud or a cloud is divided into multiple smaller clouds. Scheduling overhead may be reduced. Evaluation rules allow for a tradeoff between users' needs and system performance.

Figure 2:
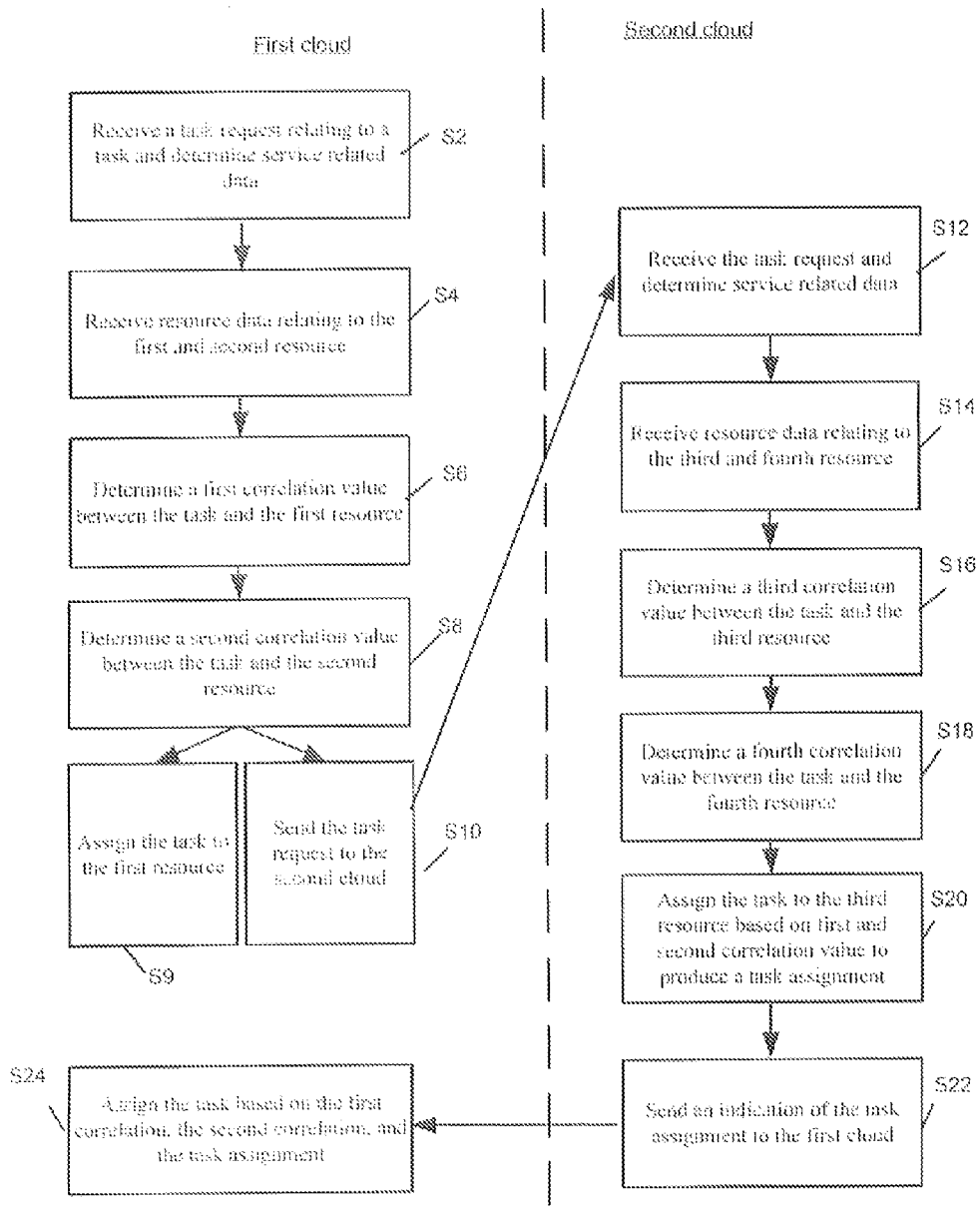
FIG. 2 depicts a flow diagram for example processes for implementing task assignment in a cloud computing environment.

FIG. 2 depicts a flow diagram for example processes for implementing task assignment in a cloud computing environment in accordance with at least some embodiments described herein. The process in FIG. 2 could be implemented using, for example, system 100 discussed above. An example process may include one or more operations, actions, or functions as illustrated by one or more of blocks S2, S4, S6, S8, S9, S10, S12, S14, S16, S18, S20 and/or S22. Although illustrated as discrete blocks, various blocks may be divided into additional blocks, combined into fewer blocks, or eliminated, depending on the desired implementation. Processing may begin at block S2.

At block S2, a first cloud may be configured to receive a task request relating to a task and determine service related data related to the task. Processing may continue from block S2 to block S4.

At block S4, the first cloud may be configured to receive resource data relating to the first and second resource. Processing may continue from block S4 to block S6.

At block S6, the first cloud may be configured to determine a first correlation value between the task and the first resource based on the service related data and the resource data. Processing may continue from block S6 to block S8.

At block S8, the first cloud may be configured to determine a second correlation value between the task and the second resource based on the service related data and the resource data. Processing may continue from block S8 to block S9 or block S10 depending upon the first and second correlation values.

At block S9, the first cloud may be configured to assign the task to the first resource.

At block S10, the first cloud may be configured to send the task request to the second cloud. Processing may continue from block S10 to block S12.

At block S12, the second cloud may be configured to receive the task request and determine the service related data. Processing may continue from block S12 to block S14.

At block S14, the second cloud may be configured to receive resource data relating to the third and fourth resource. Processing may continue from block S14 to block S16.

At block S16, the second cloud may be configured to determine a third correlation value between the task and the third resource based on the service related data and the resource data in the second cloud. Processing may continue from block S16 to block S18.

At block S18, the second cloud may be configured to determine a fourth correlation value between the task and the fourth resource based on the service related data and the resource data in the second cloud. Processing may continue from block S18 to block S20.

At block S20, the second cloud may be configured to assign the task to the third resource based on first and second correlation value to produce a task assignment. Processing may continue from block S20 to block S22.

At block S22, the second cloud may be configured to send an indication of the task assignment to the first cloud. Processing may continue from block S22 to block S24.

At block S24, the first cloud may be configured to assign the task relating to the task request based on the first correlation value, the second correlation value, and the task assignment.

Figure 3:
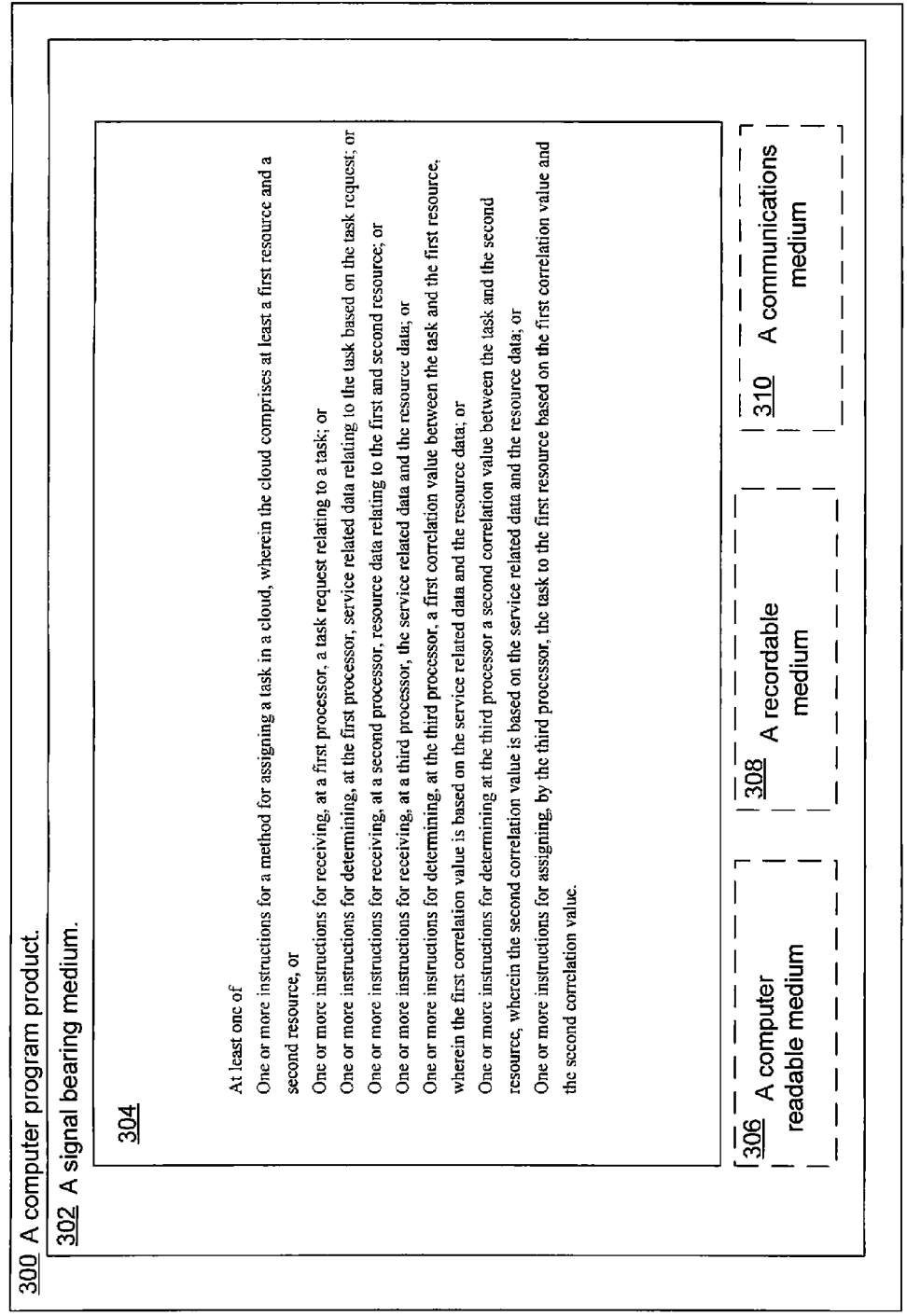
FIG. 3 illustrates computer program products for implementing task assignment in a cloud computing environment.

FIG. 3 illustrates computer program products 300 for implementing task assignment in a cloud computing environment arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-2. Thus, for example, referring to system 100, one or more of the resources in cloud 120 may undertake one or more of the blocks shown in FIG. 3 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 4 is a block diagram illustrating an example computing device 400 that is arranged to perform task assignment in a cloud computing environment in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a task assignment in cloud computing algorithm 426 that is arranged to perform the functions as described herein including those described previously with respect to FIGS. 1-3. Program data 424 may include task assignment in cloud computing data 428 that may be useful for implementing a task assignment in cloud computing algorithm as is described herein. In some embodiments, application 422 may be arranged to operate with program data 424 on operating system 420 such that task assignment in a cloud computing environment may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for assigning an assignable task in a cloud, wherein the cloud comprises at least a first resource and a second resource, the method comprising:
   receiving, at a first processor, a task request relating to the assignable task;
   determining, at the first processor, service related data relating to the assignable task based on the task request;
   receiving, at a second processor, resource data relating to the first and second resource, wherein the resource data relates to hardware effective to handle the assignable task;
   receiving, at a third processor, the service related data and the resource data;
   determining, at the third processor, a first correlation value between the assignable task and the first resource, wherein the first correlation value is based on a second and third correlation value, wherein the second correlation value is between the assignable task and tasks assigned to the first resource, and the third correlation value is between the assignable task and assigned tasks of a current task set, wherein the current task set includes tasks assigned to at least one of the first resource, the second resource and other resources in the cloud;
   determining, at the third processor, a fourth correlation value between the assignable task and the second resource, wherein the fourth correlation value is based on the third correlation value and a fifth correlation value, wherein the fifth correlation value is between the assignable task and tasks assigned to the second resource; and
   assigning, by the third processor, the assignable task to the first resource based on the first correlation value and the fourth correlation value.

2. The method as recited in claim 1, wherein the first, second, and third processors are all in the same housing.

3. The method as recited in claim 1, further comprising assigning, by the third processor, the assignable task to the first resource based on an evaluation rule.

4. The method as recited in claim 3, wherein the evaluation rule is based on a performance of the cloud.

5. The method as recited in claim 1, wherein:
   the service related data includes at least one of a number of task requests received by the first processor, a resource requested in the task request, a response time requested in the task request, a start time requested in the task request, or a communication volume requested in the task request; and
   the resource data includes at least one of a capacity of the first and second resource, a number of processors in the first and second resource, a size of memory in the first and second resources, network traffic to the first and second resources, or disc space in the first and second resource.

6. A cloud effective to assign an assignable task, the cloud comprising:
   a first resource;
   a second resource;
   a first processor;
   a second processor in communication with the first resource and the second resource; and
   a third processor in communication with the first processor and the second processor; wherein:
   the first processor is configured to receive a task request relating to the assignable task and determine service related data relating to the assignable task based on the task request;
   the second processor is configured to receive resource data relating to the first and second resource, wherein the resource data relates to hardware effective to handle the assignable task;
   the third processor is configured to determine a first correlation value between the assignable task and the first resource, wherein the first correlation value is based on a second and third correlation value, wherein the second correlation value is between the assignable task and tasks assigned to the first resource, and the third correlation value is between the assignable task and assigned tasks of a current task set, wherein the current task set includes tasks assigned to at least one of the first resource, the second resource, and other resources in the cloud;
   the third processor is configured to determine a fourth correlation value between the assignable task and the second resource, wherein the fourth correlation value is based on the third correlation value and a fifth correlation value, wherein the fifth correlation value is between the assignable task and tasks assigned to the second resource; and
   the third processor is configured to assign the assignable task to the first resource based on the first and the fourth correlation value.

7. The cloud as recited in claim 6, wherein the first, second, and third processors are all disposed in the same housing.

8. The cloud as recited in claim 6, wherein the third processor is configured to assign the assignable task to the first resource based on an evaluation rule.

9. The cloud as recited in claim 8, wherein the evaluation rule is based on a performance of the cloud.

10. A system effective to assign an assignable task, the system comprising:
    a first cloud including a plurality of processors, a first access point, a first resource and a second resource;
    a second cloud including a plurality of processors, a second access point, a third resource and a fourth resource;
    wherein the first cloud is configured to:
    receive a task request relating to the assignable task;
    determine service related data relating to the assignable task based on the task request;
    receive first resource data relating to the first and second resource, wherein the first resource data relates to hardware effective to handle the assignable task;
    determine a first correlation value between the assignable task and the first resource, wherein the first correlation value is based on a second and third correlation value, wherein the second correlation value is between the assignable task and tasks assigned to the first resource, and the third correlation value is between the assignable task and assigned tasks of a current task set, wherein the current task set includes tasks assigned to at least one of the first resource, the second resource, the third resource, the fourth resource, and other resources in the first cloud and the second cloud;
    a fourth correlation value between the assignable task and the second resource, wherein the fourth correlation value is based on the third correlation value and a fifth correlation value, wherein the fifth correlation value is between the assignable task and tasks assigned to the second resource;

send the task request to the second cloud based on the first and the fourth correlation value;

wherein the second cloud is configured to:
receive the task request;
determine the service related data relating to the assignable task based on the task request;
receive second resource data relating to the third and fourth resource, wherein the second resource data relates to hardware effective to handle the assignable task;
determine a sixth correlation value between the assignable task and the third resource, wherein the sixth correlation value is based on a seventh and eighth correlation value, wherein the seventh correlation value is between the assignable task and tasks assigned to the third resource, and the eighth correlation value is between the assignable task and assigned tasks of the current task set;
determine a ninth correlation value between the assignable task and the fourth resource, wherein the ninth correlation value is based on the eighth correlation value and a tenth correlation value, wherein the tenth correlation value is between the assignable task and tasks assigned to the fourth resource; and
assign the task to the third resource based on the sixth and the ninth correlation value to produce a task assignment.

11. The system as recited in claim 10, wherein in the first cloud:
a first processor is configured to receive the task request relating to the assignable task and determine the service related data;
a second processor is configured to receive the first resource data relating to the first and second resource;
a third processor is configured to determine the first and fourth correlation value; and
a fourth processor is configured to send the task request to the second cloud.

12. The system as recited in claim 11, wherein the first, second, third and fourth processors are all disposed in the same housing.

13. The system as recited in claim 11, wherein in the second cloud:
a fifth processor is configured to receive the task request relating to the assignable task and determine the service related data;
a sixth processor is configured to receive the second resource data relating to the third and fourth resource; and
a seventh processor is configured to determine the sixth and ninth correlation value.

14. The system as recited in claim 10, wherein:
the second cloud is configured to send an indication of the assignable task assignment to the first cloud; and
the first cloud is configured to assign the assignable task based on the first correlation value, the fourth correlation value, and the assignable task assignment.

15. The system as recited in claim 14, wherein the first cloud is configured to assign the assignable task based on a scheduling cost between the first cloud and the second cloud.

16. The system as recited in claim 10, wherein the first cloud is configured to assign the assignable task to the first resource based on an evaluation rule.

17. The system as recited in claim 16, wherein the evaluation rule is based on a performance of the first cloud.

* * * * *

UNITED STATES PATENT AND TRADEMARK OFFICE
CERTIFICATE OF CORRECTION

PATENT NO. : 8,887,169 B2  
APPLICATION NO. : 13/202226  
DATED : November 11, 2014  
INVENTOR(S) : Wang Page 1 of 1

It is certified that error appears in the above-identified patent and that said Letters Patent is hereby corrected as shown below:

In the Drawings:

In Fig. 4, Sheet 4 of 4, delete "UP/UC/DSP" and insert -- $\mu P/\mu C/DSP$ --, therefor.

In the Specification:

In Column 1, Line 7, delete "This application is a 371 of" and insert -- The present application is a U.S. national stage filing under 35 U.S.C. §371 of --, therefor.

In Column 5, Line 50, delete "task request 126" and insert -- task request 102 --, therefor.

Signed and Sealed this  
Nineteenth Day of May, 2015

Michelle K. Lee  
*Director of the United States Patent and Trademark Office*